(No Model.)

H. TRAVER & J. WEEKS.
COUPLING.

No. 373,256. Patented Nov. 15, 1887.

WITNESSES:
C. Neveux

INVENTOR:
H. Traver
J. Weeks
BY Munn &Co
ATTORNEYS.

UNITED STATES PATENT OFFICE.

HARRISON TRAVER, OF BROOKLYN, AND JOHN WEEKS, OF NEW YORK, N. Y.

COUPLING.

SPECIFICATION forming part of Letters Patent No. 373,256, dated November 15, 1887.

Application filed May 5, 1887. Serial No. 237,219. (No model.)

*To all whom it may concern:*

Be it known that we, HARRISON TRAVER, of Brooklyn, in the county of Kings and State of New York, and JOHN WEEKS, of the city, county, and State of New York, have invented a new and useful Improvement in Couplings, of which the following is a full, clear, and exact description.

Our invention relates to an improved coupling, and has for its object to provide a thoroughly effective connection for steam, gas, or water pipes, and one not affected by expansion or contraction, and wherein, when used as a hose or similar coupling, the supply will be automatically cut off from one section of pipe while the other section is disconnected therefrom.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1:
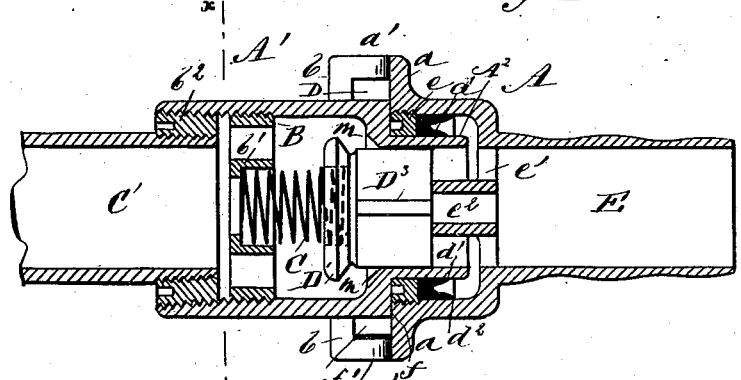
Figure 2:
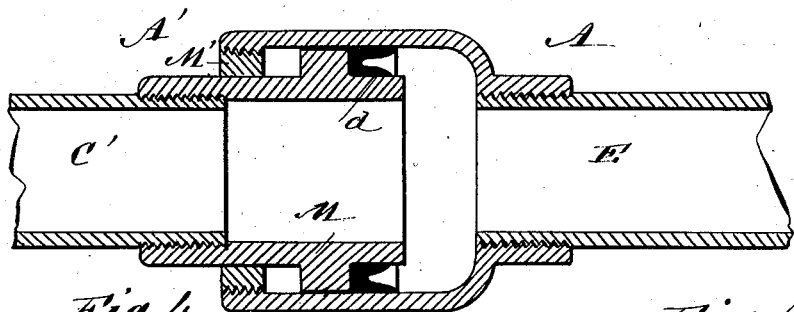
Figures 3, 4:
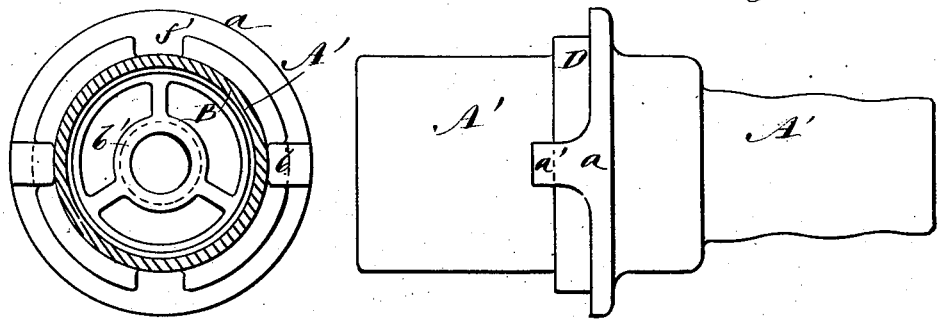
Figure 5:
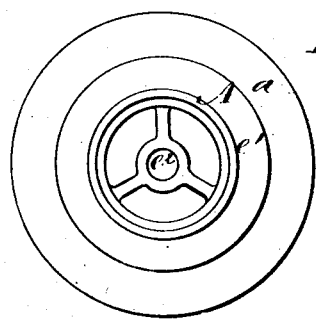

Figure 1 is a central vertical section through a coupling adapted to unite a hose or lead pipe with iron pipe, and Fig. 2 is a central vertical section through two iron pipes coupled. Fig. 3 is a side elevation of the coupling shown in Fig. 1, and Fig. 4 is a transverse sectional view partially upon line $x\ x$ of Fig. 1. Fig. 5 is an end view of Fig. 1, looking from right to left.

In carrying out the invention the section A is provided with an annular exterior flange, $a$, having opposing and aligning outwardly-projecting and integral arms $a'$, which arms are provided with short inwardly-bent right-angular projections $b$, the faces of said projections being in substantially the same horizontal plane with the exterior of the section proper A. An annular V-shaped packing, $d$, of metal or other suitable material, is made to encircle the inner surface of the section A near its outer end, the inner member, $d'$, of which packing is shorter than the outer member, $d^2$, for a reason hereinafter stated. The packing $d$ is retained in position by an externally-threaded ring, $e$, engaging the threaded interior surface of the section A and adapted to extend from the base of said packing $d$ sh with the inner end of said section. A spider, $e'$, is held in the pipe E, where the said pipe intersects with the bell of the section A, which spider is provided with a central outwardly-extending tubular projection, $e^2$, as shown in Fig. 1.

The section A' of the coupling is interiorly threaded in the rear and provided with spider B, screwed therein, in the center of which spider an open bearing, $b'$, is formed, adapted to support one end of a spiral spring, C. The inner or rear end of the section A' is united to the pipe C' by means of an interiorly and exteriorly threaded ring, $b^2$, which ring, together with the ring $e$ in section A, may be screwed in or out by an ordinary key adapted to fit in slots cut in the edges of said rings, as shown. The outer diameter of the section A' is slightly greater than the interior diameter proper of the section A. The outer end, $A^2$, of said section A' is reduced to an outer diameter nearly equal to the inner diameter of the ring $e$ and V-packing $d$, forming thereby an annular shoulder, $f$, adapted to engage the outer edge of the said ring $e$ and a portion of the bell of said section A.

In alignment with the shoulder $f$ upon the body of section A' an integral ring, D, is formed, having aligning and opposing slots $f'$, adapted to receive the projections $b'$ of the arms $a$. The shoulder formed upon the inner surface by the reduction of the section A is cut away upon an incline to form a seat, $m$, for a valve, D'. The rear face of the valve D' has a bearing upon the spring C, and the said valve is guided by means of three or more wings, $D^3$, having a bearing against the inner reduced surface of the section A'.

In operation, when the two sections are brought together, the projections $b$ are entered in the slots $f'$ and the section A turned, whereupon the said projections, traveling in contact with the ring D, lock the two sections together, and the tubular projection $e^2$, striking the wings $D^3$, forces and holds the said valve back, allowing free flow of the water. It is obvious that when the sections are disconnected the valve D' will automatically seat itself and cut off the flow.

In Fig. 2 a coupling of two iron pipes is shown. The section A, which is screwed upon the pipe E, is provided with an interior thread at the end, and also with an interior V-packing, $d$, similar to that heretofore described. The section A', which is smaller in diameter than the section A, is screwed upon the pipe C', and provided near its outer edge with an external annular projection, M, of a height sufficient to substantially engage the inner surface of the section A, when the two sections are united. The V-shaped packing is adapted to engage the outer side of the projection M. To couple the coupling, a ring, M', adapted to slide upon the section A', is screwed into the end of the section A. The pipes may now expand and contract without injury to the coupling, as the water or other substance passing through will enter the V of the packing and expand the same.

By reason of the short member of the V-packing the steam or water has a more effective bearing upon the same.

Having thus described our invention, what we claim as new, and desire to secure by Letters Patent, is—

1. In a coupling, the combination, with the section A, provided with the spider $e'$, having the central projection, $e^2$, of the section A', secured to the section A and provided with the spider B, the valve D, and the spring C, seated in the spider B and bearing against the valve, substantially as herein shown and described.

2. In a coupling, the combination of the section A, provided with the flange $a$, having the angular arms $a'$ $b$, the section A', having an inner reduced end, $A^2$, and shoulder $f$, and provided with the ring D, having the slots $f'$, the ring $e$, screwed into the section A, between the two sections and adjacent to the shoulder of the section A', and the packing $d$ between the said sections and adjacent to the ring $e$, substantially as herein shown and described.

3. The combination, with the section A, having the exterior projection $a$, angular arms $a'$ $b$, V-shaped packing $d$, and ring $e$, of the section A', adapted to enter said section A, provided with the slotted ring D $f'$, and receive the angular arms $a'$, and a winged valve, D', held in said section A', adapted to be automatically operated by the opposing section, substantially as shown and described.

HARRISON TRAVER.
JOHN WEEKS.

Witnesses:
GEO. DILLON,
A. G. HAMBLEY.